(12) United States Patent
McCord et al.

(10) Patent No.: US 7,971,905 B2
(45) Date of Patent: Jul. 5, 2011

(54) FOLDING ROLLOVER PROTECTION SYSTEM

(75) Inventors: Christopher T. McCord, Thomson, GA (US); Gregory E. Childs, Grovetown, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/604,729

(22) Filed: Oct. 23, 2009

(65) Prior Publication Data

US 2011/0095514 A1  Apr. 28, 2011

(51) Int. Cl.
*B60R 21/13* (2006.01)
(52) U.S. Cl. .................................................... 280/756
(58) Field of Classification Search .................. 280/748, 280/756; 296/105, 190.03, 190.04; 403/93, 403/100
See application file for complete search history.

(56) References Cited

U.S. PATENT DOCUMENTS

| 4,949,991 | A | 8/1990 | Ludwig |
| 5,042,835 | A * | 8/1991 | Burns ........................... 280/756 |
| 5,503,430 | A | 4/1996 | Miki et al. |
| 5,779,272 | A | 7/1998 | Panek et al. |
| 5,839,758 | A | 11/1998 | Finch et al. |
| 7,222,882 | B2 | 5/2007 | Boucher |
| 7,568,732 | B2 | 8/2009 | Schlup, Jr. |
| 7,661,709 | B2 * | 2/2010 | Becker ........................... 280/756 |
| 2007/0290493 | A1 | 12/2007 | David |
| 2010/0187799 | A1* | 7/2010 | Schmidt et al. ............... 280/756 |

* cited by examiner

*Primary Examiner* — Paul N Dickson
*Assistant Examiner* — Robert A Coker

(57) ABSTRACT

A folding rollover protection system includes an upper ROPS hinged to a lower ROPS and movable between an upright position and a folded down position. An isolation member may be urged between the upper and lower ROPS to separate them from each other. The isolation member may be a resilient wedge-shaped member positioned between a first wedge and a second wedge. The first wedge is movable toward the second wedge to urge the isolation member against one of the ROPS, isolating the upper ROPS from the lower ROPS.

12 Claims, 3 Drawing Sheets

FOLDING ROLLOVER PROTECTION SYSTEM

FIELD OF THE INVENTION

The present invention relates to rollover protection systems for off road vehicles, and more specifically to folding rollover protection systems (ROPS) for tractors, lawn and garden vehicles, and riding mowers.

BACKGROUND OF THE INVENTION

For safety reasons, tractors, lawn and garden vehicles, and riding mowers may be provided with some form of rollover protection system, or ROPS, to prevent the vehicle from crushing the operator if it accidentally rolls over. The ROPS should be capable of supporting the forces generated by the weight of the vehicle in the event of a rollover, maintaining free space for the operator to reduce the danger of injury.

If a cab is provided, the ROPS may be built into the cab. If a cab is not provided, the ROPS may consist of a generally U-shaped crossbar located above the head of the operator, and legs connected to the vehicle frame.

The ROPS may be straight tubing, and brackets may be welded to the legs or lower section to connect the ROPS to the vehicle frame. The legs or lower section of the ROPS may be welded in a position perpendicular to the vehicle frame. A ROPS is designed to absorb energy from the weight of the vehicle, and the brackets transfer energy from the ROPS to the vehicle frame.

Some ROPS may be adjustable to change the height of the ROPS in certain situations. For example, U.S. Pat. No. 4,877,265 relates to a ROPS that is easily adjustable between different heights, and U.S. Pat. Nos. 4,949,991; 5,503,430; 5,779,272; 5,839,758; and 7,568,732 relate to ROPS that can be folded from a raised or upright position to a lowered or folded down position.

Some folding ROPS are designed so that an operator can easily move the ROPS from the upright position to the folded down position, and lock it in place without the use of tools. For example, a folding ROPS may use retention pins (e.g., rods, clips or bolts) that are inserted through holes or slots in the upper and lower ROPS, and/or through holes in hinge plates joining the upper and lower ROPS. However, the retention pins may fit too snugly or too loosely in the holes. As a result, if the retention pins are too tight, the operator must use a hammer and punch to loosen and remove the pins. If the retention pins become too loose, especially due to wear of the ROPS system, the gap between the pin and hole allows the ROPS to rattle during use.

A folding ROPS is needed that may be easily folded and locked in a raised or lowered position without tools. A folding ROPS is needed that can isolate the upper ROPS from the lower ROPS without rattling during use. A folding ROPS is needed that uses retention pins that do not become stuck, and that do not become loose.

SUMMARY OF THE INVENTION

A folding rollover protection system for a tractor or other off road vehicle such as a riding mower includes an upper ROPS pivotably mounted to a lower ROPS, and an isolation member positioned between the upper and lower ROPS. The isolation member may be a rubber wedge centered between a first wedge and a second wedge. A control may be provided to move the first wedge and the second wedge closer together to urge the center wedge against the upper and/or lower ROPS to isolate them from each other. The folding ROPS of the present invention may be easily folded and locked in a raised or lowered position without tools, can isolate the upper ROPS from the lower ROPS without rattling during use, and prevents retention pins from getting stuck or loosening.

DESCRIPTION OF THE PREFERRED EMBODIMENT

Figure 1:
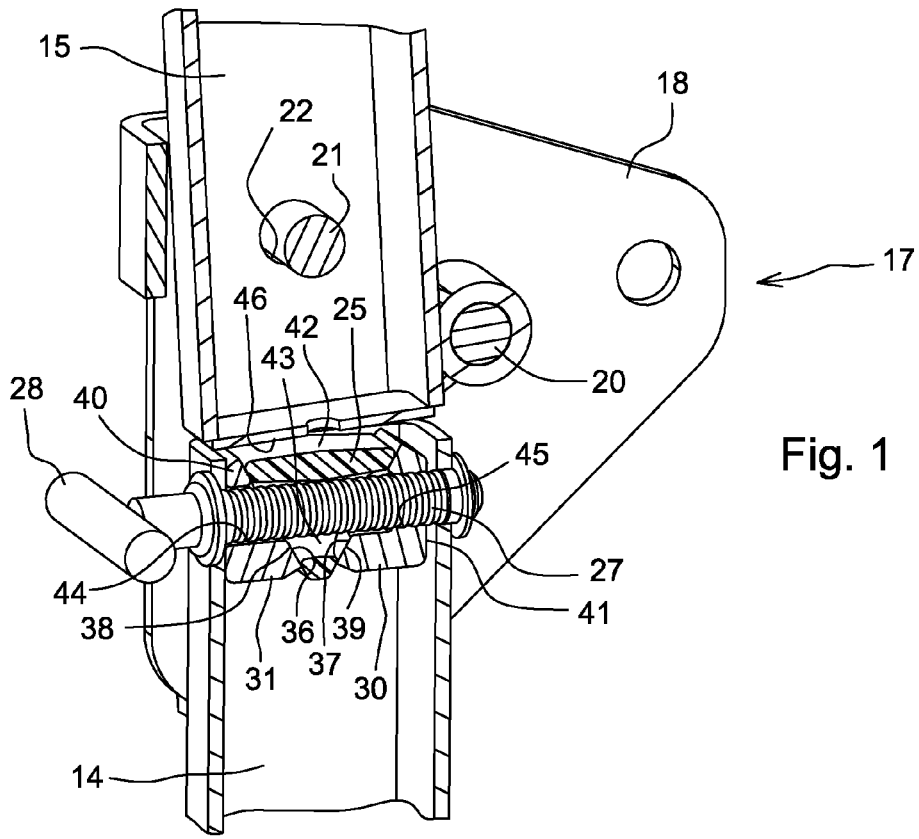
FIG. 1 is a section view of a folding rollover protection system with the isolation member in a lowered position according to one embodiment of the invention.
Figure 2:
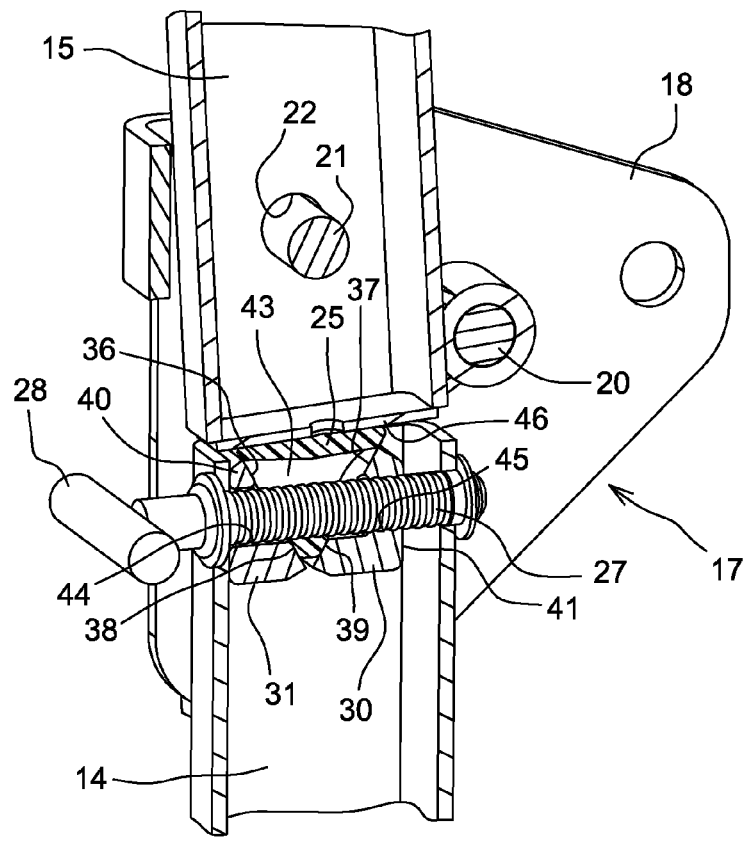
FIG. 2 is a section view of a folding rollover protection system with the isolation member in a raised position according to one embodiment of the invention.
Figure 3:
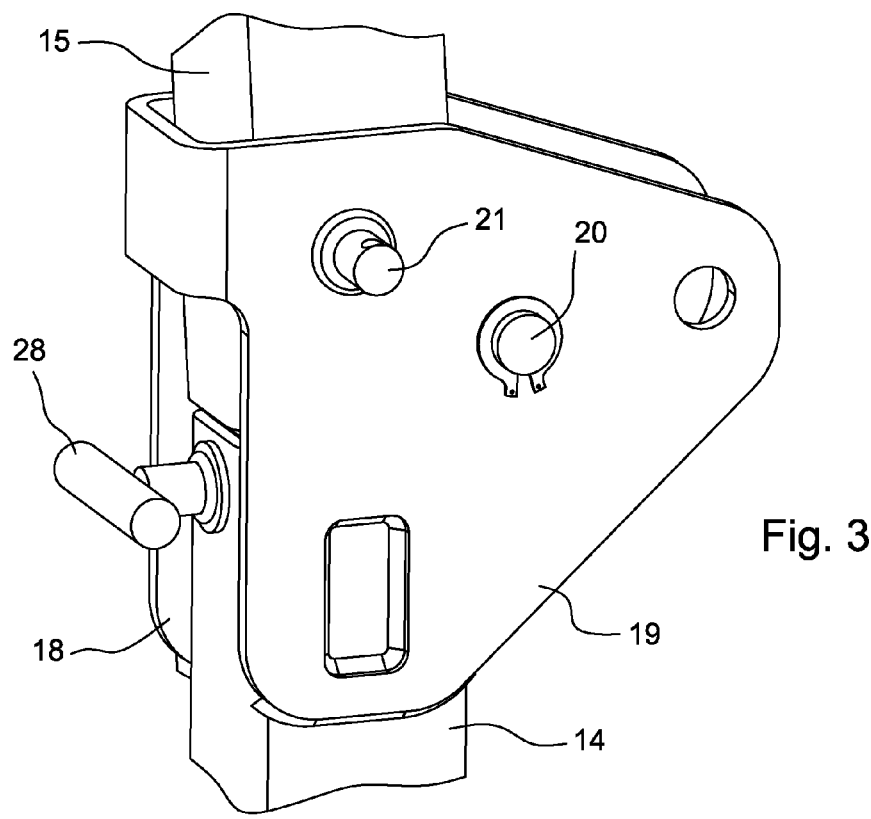
FIG. 3 is a perspective view of a folding rollover protection system in the upright position according to the first embodiment.
Figure 4:
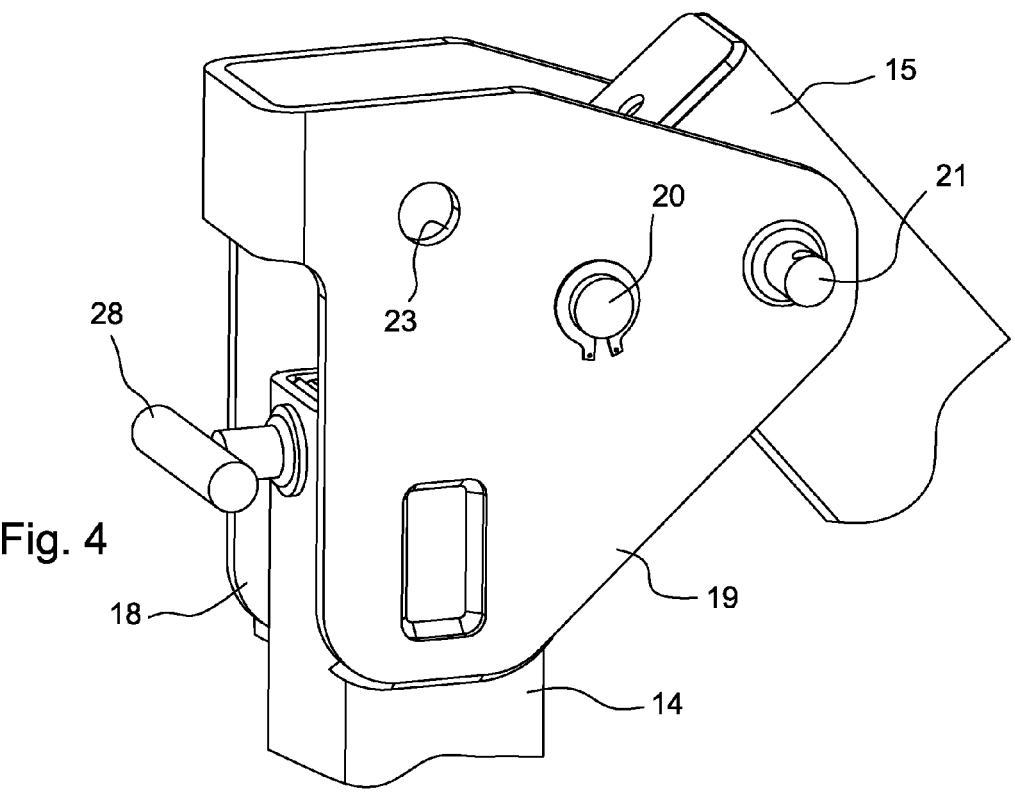
FIG. 4 is a perspective view of a folding rollover protection system in the folded down position according to the first embodiment.
Figure 5:
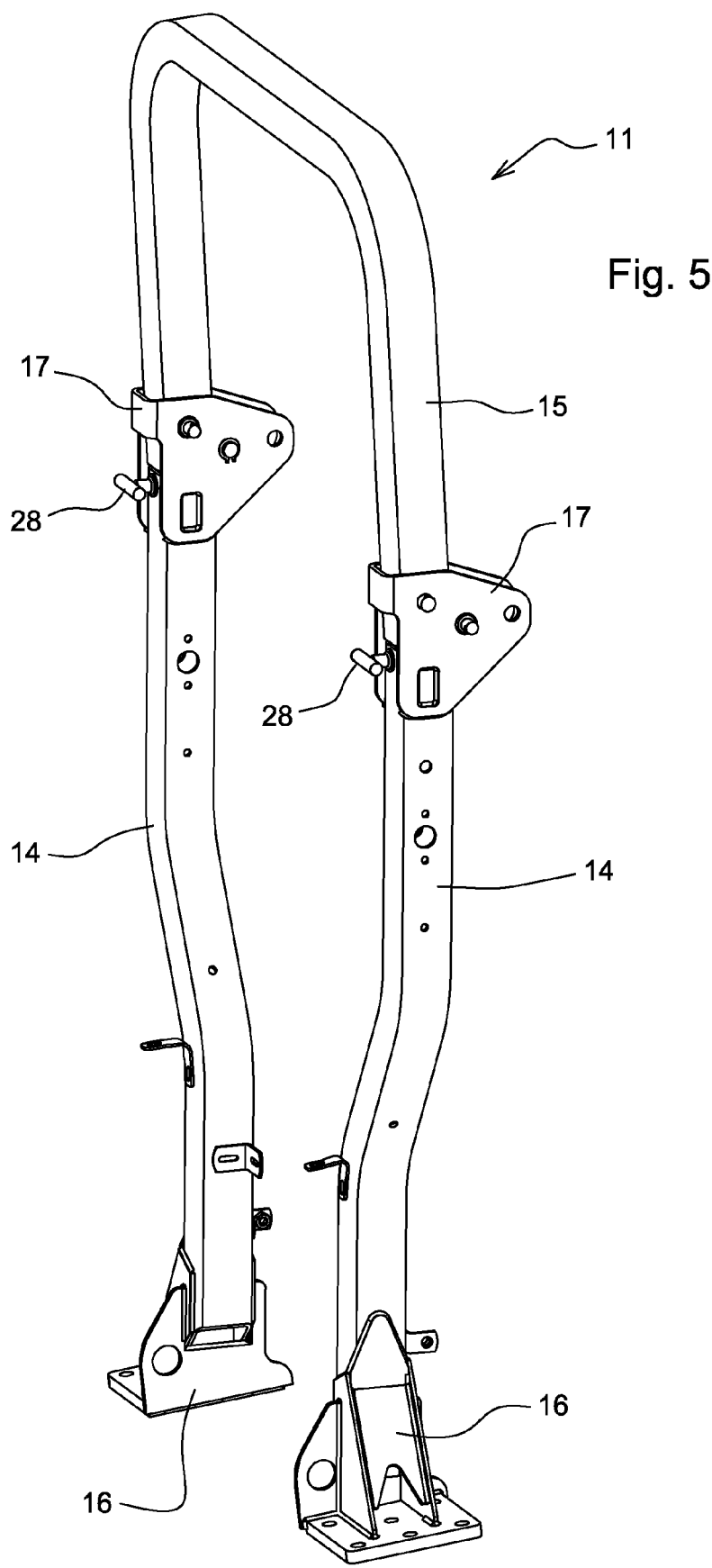
FIG. 5 is a perspective view of a folding rollover protection system according to a first embodiment of the invention.

As shown in FIGS. 1-5, folding ROPS 11 may be fastened to a frame of a utility tractor, lawn and garden tractor, or grass mowing machine. The folding ROPS may be mounted to the tractor frame on each side of an operator station. The folding ROPS may include a lower ROPS 14 with a pair of lower legs hinged to an upper ROPS 15 having an inverted U-shape and crossbar. The upper and lower ROPS may be tubular steel with a generally rectangular cross section, and the lower legs may be mounted or welded to support brackets 16 fastened to the tractor frame.

In one embodiment, hinge assembly 17 may be provided between each of the legs of lower ROPS 14 and upper ROPS 15. Each hinge assembly 17 may include a pair of hinge plates 18, 19 welded to the tubing walls of the lower or upper ROPS. The hinge plates may be parallel to each other, with a gap between the pair of plates that is sufficient for the tubing walls of the upper ROPS to slide therebetween and pivot between the raised or upright, and lowered or folded down positions. Pivot member 20 extends transversely between each pair of plates and provides an axis on which the upper section of the folding ROPS can pivot between the upright and folded down positions. Additionally, one or more pins 21 may be inserted through holes 22, 23 through the upper ROPS tubing walls and hinge plates to secure the upper ROPS in either of the upright or folded down positions. The pins may be rods, clips or bolts. Each of the holes 22 through the tubing walls of the upper ROPS may have a diameter slightly larger than the outer diameter of pin 21.

In one embodiment, isolation members 25 may be positioned between the upper and lower ROPS. Each isolation member may be selectably moved or urged against either or both of the upper and lower ROPS. Each isolation member may eliminate and close up any gap between the upper and lower ROPS, and isolate the upper and lower ROPS from each other. Once the isolation member is urged against the upper and/or lower ROPS, it separates the ROPS sections from each other to prevent rattling. The isolation member may be rubber or other resilient material such as urethane or other thermoplastic, and may be urged against a metal end plate of one or both ROPS sections. Alternatively, the isolation member may be steel or plastic, and may be urged against one or more resilient pads made of rubber or similar resilient material on the end of the upper or lower ROPS.

In one embodiment, each isolation member 25 may be wedge-shaped. Additionally, each isolation member may be positioned between first and second wedges 30, 31. At least one of the first and second wedges may be threaded to tensioning screw 27. For example, first wedge 30 may be an internally threaded drive wedge positioned on one side of the isolation member, and second wedge 31 may be a stationary wedge positioned on the other side of the isolation member. Each of the first and second wedges may have inwardly facing sloped surfaces 36, 37 that are in sliding contact with the outwardly and downwardly facing sloped surfaces 38, 39 on each side of the isolation member. The isolation member may be moved and urged against the opposing ROPS by moving one or both of wedges 30, 31 toward the other wedge. For example, the drive wedge may be moved closer toward the stationary wedge so that the sloped surfaces 36, 37 urge the isolation member against the opposing ROPS.

In one embodiment, the isolation member may be positioned inside the tubing of one of the ROPS sections, and may be selectably moved against the opposing ROPS. Additionally, each of the first and second wedges may have outwardly facing square sides 40, 42 that are dimensioned to fit inside the rectangular section of the ROPS tubing. The inside walls of the ROPS tubing align the wedges and prevents rotation of the wedges as the tensioning screw is turned. With the upper ROPS in the upright position, the isolation member also helps hold pin 21 in place. The isolation member pushes up against the upper ROPS and forces the edge of opening 22 against pin 21.

In one embodiment, tensioning screw 27 may be used to move the isolation member against the opposing ROPS. Tensioning screw 27 may pass through the walls of the ROPS tubing and may be fixed in place using either cotter pins or snap rings. The tensioning screw may have a handle 28 perpendicular to the tensioning screw axis. The operator may grip the handle to turn the tensioning screw to move the isolation member against the opposing ROPS.

In one embodiment, tensioning screw 27 may be inserted through the ROPS tubing and pass through holes in each of the drive wedge 30, isolation member 25, and stationary wedge 31. The stationary wedge may have a through hole 44 that is at least 2 mm larger than the tensioning screw OD. The center wedge may have a slot 43 that is at least 2 mm wider than the tensioning screw, and at least 6 mm longer than the screw OD. The drive wedge may have a tapped through hole 45 matching the thread profile of the tensioning screw. The flat surface 42 of the isolation member faces an endplate 46 of the opposing ROPS. As the tensioning screw is turned clockwise, the drive wedge advances and its sloped surface 37, along with the sloped surface 36 of the stationary wedge, moves the isolation member into contact the opposing ROPS. Continued advancement of the tensioning screw pushes the drive wedge closer to the stationary wedge and tightens the isolation member against the opposing ROPS, eliminating any gaps between the upper and lower ROPS. By abutting tightly against the end plate 46 of the opposing ROPS, the isolation member prevents the ROPS from rattling.

In one embodiment, the tensioning screw may be turned in a second direction to move the drive wedge away from the stationary wedge. By increasing the separation between the drive wedge and stationary wedge, the isolation member may be moved away from the opposing ROPS. Once the isolation member no longer is urged into tight contact between the upper and lower ROPS, hole 22 in the hinge plate releases pin 21, so that the operator can easily remove the pin and fold down the upper ROPS.

Having described the preferred embodiment, it will become apparent that various modifications can be made without departing from the scope of the invention as defined in the accompanying claims.

The invention claimed is:

1. A folding rollover protection system, comprising:
   an upper ROPS (Rollover Protection System) hinged to a lower ROPS and movable between an upright position and a folded down position;
   a resilient isolation member positioned between a first wedge and a second wedge; the first wedge movable toward the second wedge to urge the isolation member tightly between the upper ROPS and lower ROPS.

2. The folding rollover protection system of claim 1 further comprising a tensioning screw extending through the isolation member and in threaded engagement with the first wedge.

3. The folding rollover protection system of claim 1 further comprising a hinge mechanism having a pair of parallel plates fastened to the lower ROPS and pivotably connected to the upper ROPS.

4. The folding rollover protection system of claim 3 further comprising a pin extending between each pair of plates on which the upper ROPS pivots.

5. The folding rollover protection system of claim 3 further comprising a pin insertable through holes in the upper ROPS and pair of plates to hold the upper ROPS in the upright position.

6. The folding rollover protection system of claim 5 wherein the isolation member urges the upper ROPS upwardly so that the hole in the upper ROPS engages the pin to hold the pin stationary.

7. A folding rollover protection system, comprising:
   an upper ROPS pivotably mounted to a lower ROPS;
   an isolation member positioned between the lower ROPS and the upper ROPS;
   a control to urge the isolation member tightly against at least one of the upper and lower ROPS and isolate the upper ROPS from the lower ROPS;
   wherein the control is an externally threaded tensioning screw; and
   a first wedge adjacent the isolation member and internally threaded to the tensioning screw.

8. The folding rollover protection system of claim 7 wherein the upper ROPS includes a pair of upright portions and a crossbar.

9. A folding rollover protection system, comprising:
   an inverted U-shaped upper ROPS (Rollover Protection System) hinged to a lower ROPS; each of the upper ROPS and lower ROPS being tubular steel with a generally rectangular cross section; and
   a wedge-shaped isolation member positioned between a drive wedge and a stationary wedge, the isolation member abutting one of the upper and lower ROPS in response to movement of the drive wedge toward the stationary wedge.

10. The folding rollover protection system of claim 9 further comprising a tensioning screw engageable with the drive wedge.

11. The folding rollover protection system of claim 9 wherein the isolation member is rubber.

12. The folding rollover protection system of claim 9 further comprising a pin extending through the tubular steel upper ROPS for locking the upper ROPS in an upright position.

* * * * *